United States Patent
Takbiriborujeni et al.

(10) Patent No.: US 12,299,864 B1
(45) Date of Patent: May 13, 2025

(54) LOCALIZED DEFECT DETECTION

(71) Applicant: Amazon Technologies, Inc., Reno, NV (US)

(72) Inventors: Ali Takbiriborujeni, Lynnwood, WA (US); Mehdi Eftekhari Far, Issaquah, WA (US); Mahesh Viswanathan, White Plains, NY (US)

(73) Assignee: Amazon Technologies, Inc., Reno, NV (US)

( * ) Notice: Subject to any disclaimer, the term of this patent is extended or adjusted under 35 U.S.C. 154(b) by 642 days.

(21) Appl. No.: 17/546,807

(22) Filed: Dec. 9, 2021

(51) Int. Cl.
| | |
|---|---|
| G06K 9/62 | (2022.01) |
| G06N 3/08 | (2023.01) |
| G06T 7/00 | (2017.01) |
| G06V 10/25 | (2022.01) |
| G06V 10/778 | (2022.01) |

(52) U.S. Cl.
CPC ............ *G06T 7/0004* (2013.01); *G06V 10/25* (2022.01); *G06V 10/7788* (2022.01)

(58) Field of Classification Search
CPC ... G06T 7/0004; G06T 7/0002; G06T 7/0008; G06T 7/11; G06V 10/25; G06V 10/7788; G06V 10/764; G06V 10/82; G06V 10/454; G06V 10/464; G06V 10/751; G06V 10/774; G06V 10/7784; G06V 20/00; G06V 30/248; G06N 3/08; G06N 3/045; G06N 20/20; G06N 3/04; G06N 3/047; G06N 3/088; G06N 5/01; G06N 5/045; G06N 3/042; G06N 3/044; G06N 3/049; G06N 3/084; G06N 5/022; G06N 5/025

See application file for complete search history.

(56) References Cited

U.S. PATENT DOCUMENTS

| | | | |
|---|---|---|---|
| 2020/0160083 A1* | 5/2020 | Zhu | G06N 3/08 |
| 2020/0300784 A1* | 9/2020 | Ohbayashi | G01N 23/083 |
| 2021/0182713 A1* | 6/2021 | Kar | G06N 20/20 |
| 2023/0196096 A1* | 6/2023 | Milne | G06N 3/047 |
| | | | 706/25 |

* cited by examiner

*Primary Examiner* — Michael J Vanchy, Jr.
(74) *Attorney, Agent, or Firm* — Hogan Lovells US LLP

(57) ABSTRACT

Images classified as including defects can be analyzed using localized anomaly detection to determine which regions of the images contributed to the classification. These techniques may identify one or more regions of the images having a confidence value exceeding a threshold or range as a factor in the classification. Using a number of different localized anomaly detection techniques may enable aggregation of the results to determine regions that overlap between the different techniques, thereby providing a higher confidence that these regions include defects. Such an approach can not only identify whether a defect is present, but also identify locations, sizes, or types of defects.

20 Claims, 10 Drawing Sheets

LOCALIZED DEFECT DETECTION

BACKGROUND

Computer vision techniques may be used to analyze and classify input images in accordance with training data for one or more machine learning systems. These classifications are often binary classifications, where an image is classified as either having or including one or more features or not. High level classifications may be insufficient where images include multiple different features that may lead to various different classifications. Additionally, merely knowing an image classification may not be enough information to identify a location of the features that lead to the classification.

BRIEF DESCRIPTION OF THE DRAWINGS

Various embodiments in accordance with the present disclosure will be described with reference to the drawings, in which.

DETAILED DESCRIPTION

Figure 1:
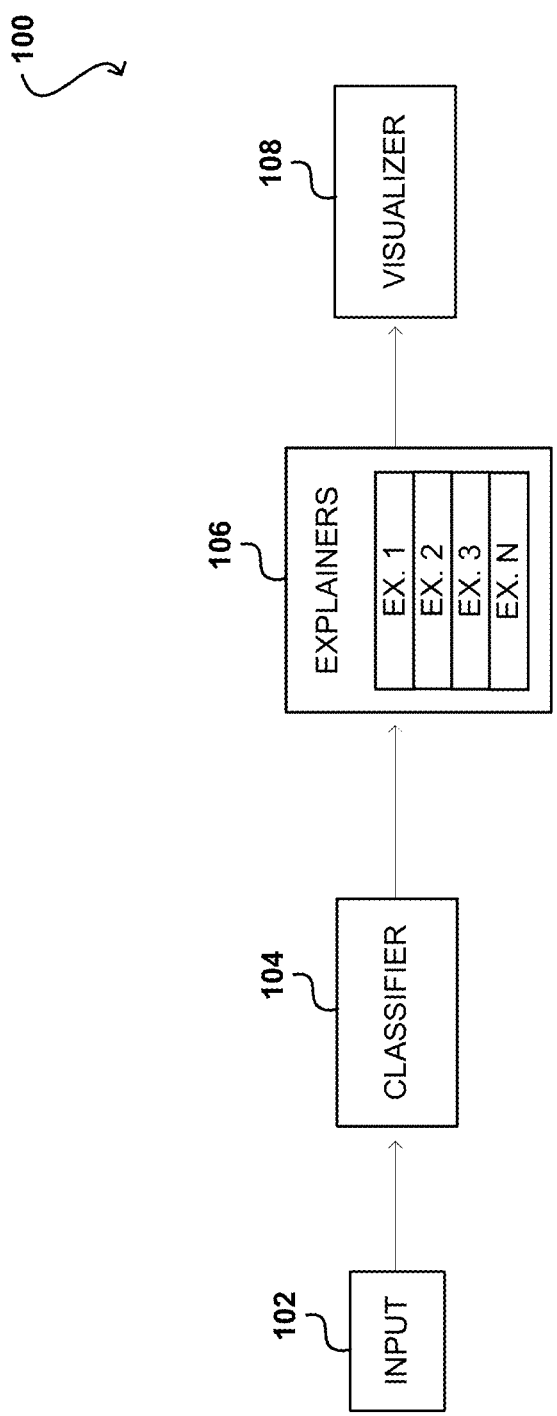
FIG. 1 illustrates an example system for performing local defect detection that can be utilized in accordance with various embodiments.

Approaches in accordance with various embodiments can be used for localized defect detection in images (e.g., still images, videos, etc.). In at least one embodiment, localized defect detection uses a combination of machine learning techniques in order to identify one or more particularized regions within an image that may have contributed toward classifying the image as including a defect. These techniques may be referred to as explainers to understand why one or more images were identified as including a defect, and moreover, to visualize the regions associated with the defect. In at least one embodiment, a human reviewer may then analyze the image with one or more overlays, such as a heat map or other identifying information, in order to identify the one or more regions including the defect. As such, the human reviewer will be provided with more information as to why an image was classified as including a defect.

Various embodiments may be directed toward improving how machine learning (ML)-enabled computer vision (CV) methods are used for image classification, segmentation, synthesis, and the like. By way of example only, various embodiments may be utilized in one or more industrial, medical, or scientific applications for identifying defects or anomalies (e.g., visual anomaly detection) in images and videos (e.g., still images, video streams, ultrasounds, CT scans, X-rays, spectroscopic analysis, etc.). In at least one embodiment, systems and methods may be incorporated into one or more services or products that utilize ML classification, which may include binary classification at an image-level. By incorporating various embodiments of the present disclosure, defects may be identifiable by one or more of a type of defect, a number of defects, or a region or location of defects.

In accordance with embodiments of the present disclosure, one or more methods for anomaly detection may be utilized in order to facilitate localized defect detection based, at least in part, on a determination on how and/or why an image was identified as containing one or more defects. Various embodiments may use a variety of different methods and, based at least in part on these methods, may generate one or more heat maps that illustrate an area or region of an image indicative of a defect, which may be based, at least in part, on one or more generated confidence scores. An input image may be analyzed to determine whether or not a defect is present, and if so, one or more additional explainers may be used to localize the defects on the image and output a visual representation of such defects, which may be a collection or aggregate of the localized visual representations. In at least one embodiment, the one or more explainers may operate in parallel, or substantially in parallel, in order to decrease processing time. Accordingly, systems and methods may generate an output that not only provides an indication of a defect, but further provides rationale as to why and where defects are located. In certain embodiments, a human reviewer may then review the output and provide feedback that may be used to train or otherwise update the classifier and/or explainer, thereby providing improved results as the system is used over time.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

FIG. 1 illustrates an example pipeline 100 in which aspects of various embodiments can be implemented. It should be understood that this is merely an example pipeline and there can be various other configurations, components, and arrangements. Furthermore, one or more components have been removed for clarity with the present discussion. This example shows a pipeline that can be implemented with one or more services, such as a networked service that is provided over one or more distributed computing environments, where one or more users may access services that utilize the pipeline. In at least one embodiment, a user may provide an input 102, which may correspond to one or more images or videos. The input 102 may be provided directly by the user, via a link to one or more storage locations, or the like. Furthermore, it should be appreciated that the input 102 may be one or more still images, a saved video, a live video stream, or one or more images extracted from a video, among other options.

The input 102 is provided to a classifier 104, which may include one or more machine learning systems. In at least one embodiment, the classifier 104 may be part of a stand-alone defect identification service or incorporated into components of one or more services provided through, for example, a distributed computing environment. The classifier 104 may include one or more different classifiers that can analyze historical data, or receive processed historical data, and can analyze that data to determine or classify any potential detects that may be inferred from the data. In at least one embodiment, this may include determining one or more features within an image and comparing the one or more features to an expected version of the one or more features. It should be understood that the use of defect in this application can refer to an appearance, location, frequency, dimension, or the like that exceeds a threshold or falls outside a typical or expected range.

In accordance with various embodiments, the classifier 104 may be associated with one or more ML-enabled CV applications that, by way of example only, may determine one or more feature vectors for different portions of an image. In one such approach, embodiments of the present invention can use one or more a convolutional neural networks (CNNs). For example, classifiers may be trained to identify feature descriptors (also referred herein as visual attributes) corresponding to visual aspects of a respective image of a plurality of images. The feature descriptors can be combined into a feature vector of feature descriptors. Visual aspects of an item represented in an image can include, for example, a shape of the item, dimensions of the item, a location of the item, a frequency of the item, and the like. Visual attributes are features that make up the visual aspects of the item. The classifier can be trained using the CNN.

In accordance with various embodiments, CNNs are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer which along with a set of adjacent layers forms the convolution portion of the network. The bottom layer of the convolution layer along with a lower layer and an output layer make up the fully connected portion of the network. From the input layer, a number of output values can be determined from the output layer, which can include several items determined to be related to an input item, among other such options. CNN is trained on a similar data set, so it learns the best feature representation of a desired object represented for this type of image.

The classifier 104 can include appropriate hardware and software for processing the unclassified data using a trained model. In some instances the classifier will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

Even when using GPUs, accelerators, and other such hardware to accelerate tasks such as the training of a model or classification of data using such a model, such tasks can still require significant time, resource allocation, and cost. For example, if the machine learning model is to be trained using 100 passes, and the data set includes 1,000,000 data instances to be used for training, then all million instances would need to be processed for each pass. Different portions of the architecture can also be supported by different types of devices. For example, training may be performed using a set of servers at a logically centralized location, as may be offered as a service, while classification of raw data may be performed by such a service or on a client device, among other such options. These devices may also be owned, operated, or controlled by the same entity or multiple entities in various embodiments.

In at least one embodiment, the classifier 104 may be a binary classifier that identifies the input 102 as either including a defect or not including a defect. It should be appreciated that other types of classifiers may be used in various embodiments, and that the classifier 104 may include multiple different models. If the classifier 104 determine that there are no defects in the input 102, the process may end to conserve processing resources. For example, in at least one embodiment, initial classification may be performed by a user, with subsequent analysis being performed by one or more other services. As such, images that are not initially labeled as including a defect may not be provided to the service for further evaluation. However, if the classifier 104 determine a defect is present, one or more explainers 106 may be used to distinguish different regions or portions of the input 102 that correspond to the defect. By way of example, the explainers 106 may refer to one or more methods for localized anomaly detection, which may further utilize various machine learning systems. It should be appreciated that a variety of different methods or models may be used for localized defect detection.

In at least one embodiment, one or more of the explainers 106 include a SHAP Gradient Explainer. SHAP is a method to explain individual predictions. The SHAP explanation method computes Shapley values from coalitional game theory. The feature values of a data instance act as players in a coalition. Shapley values describe how to fairly distribute the prediction among the features. A player can be an individual feature value or a group of feature values. For example, to explain an image, pixels can be grouped to super pixels and the prediction distributed among them.

In at least one embodiment, one or more of the explainers 106 include Activation Layer Visualizations. This technique may be used to visualize how a given input comes out of specific activation layers. That is, techniques explore which feature maps are getting activated in the model and visualize them. In various embodiments, this is done by looking at each/any specific layer to obtain an idea of which feature maps are getting activated and what parts of the image these maps typically focus on.

In at least one embodiment, one or more of the explainers 106 include Grad-CAM. Grad-CAM produces "visual explanations" for decisions from a large CNN-based model by computing the gradients of the target function with respect to the convolutional layer outputs (not including fully connected layers).

In at least one embodiment, one or more of the explainers 106 include Occlusion sensitivity. The image affects a neural network model's confidence by occluding parts of the image iteratively, such as by using a gray mask to systematically occlude different portions of the input image and monitor the output of the classifier. If the classification model fails to detect any anomaly then the occluded region is the region of the anomaly.

It should be appreciated that these techniques are provided by way of example only, and that more or fewer techniques may be used with embodiments of the present disclosure. A visualizer 108 may take output information for one or more of the explainers 106 to produce an output image or output information, which may be an image that can be analyzed by a human reviewer. For example, one or more of the explainers 106 may provide information that enables generation of one or more heat maps. The heat maps may include a visual overlay on the input 102 that includes different colors or shading on regions with higher confidence values than other regions. Heat maps for different explainers 106 may then be analyzed and compared, where overlapping regions may have a higher confidence value than regions that are only identified in a single explainer 106. For example, an intensity of the heat map may provide a confidence score (e.g., a sigmoid functions is applied to the area under the map to obtain a 0-1 score). Information from the heat maps may then be used to detect defects from the input 102. For example, if all the heat maps agree, then it can be determined with a threshold level of confidence that the explainers 106 have correctly identified the anomalous region or regions. If a majority of heat maps agree, then the explainers 106 have correctly identified the anomalous region with some reduced degree of confidence. If there are an even number of explainers that produce a tied result, then and output may correspond to a visualization with all regions identified, which may correspond to a lower confidence.

Figure 2:
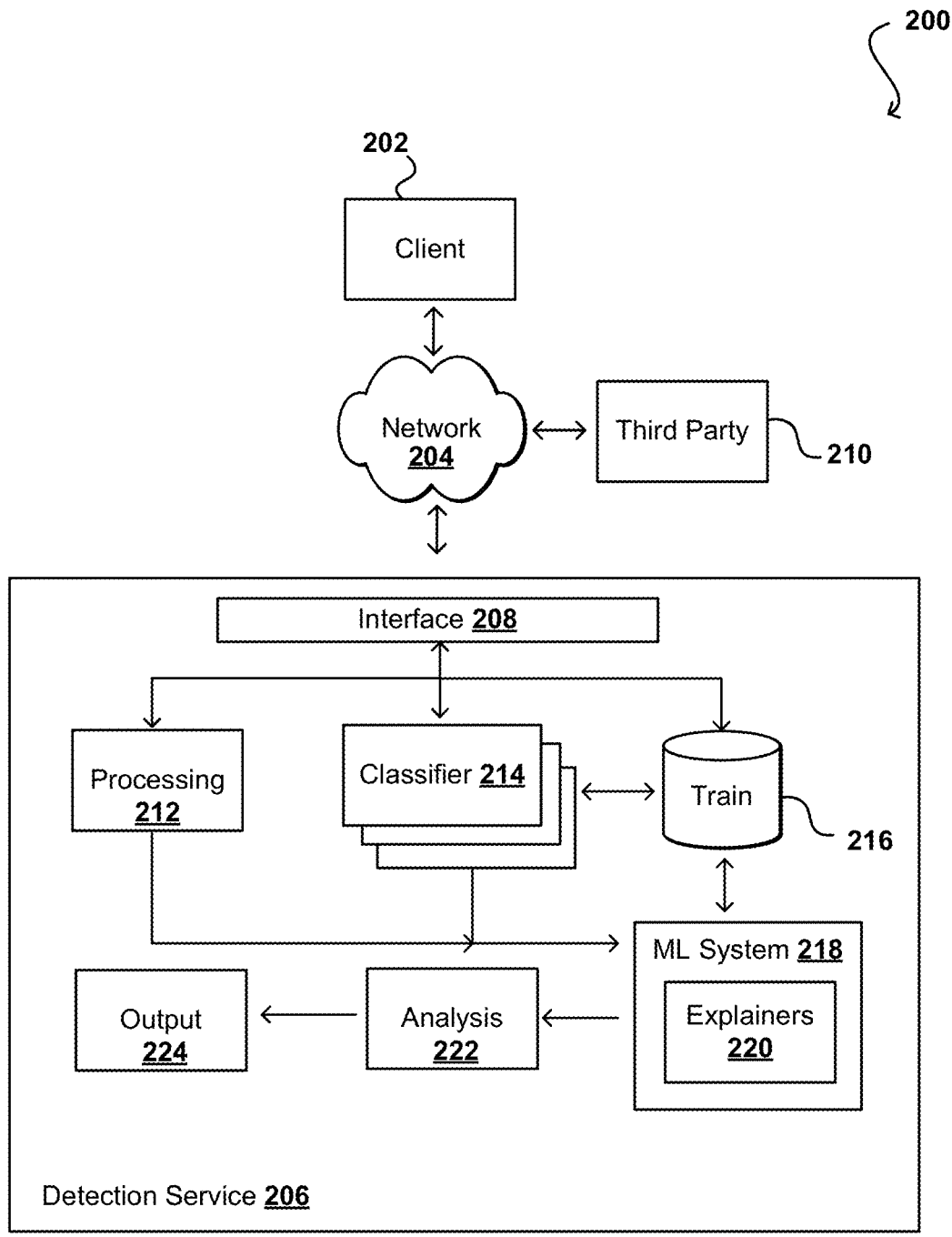
FIG. 2 illustrates an example system for defect detection that can be utilized in accordance with various embodiments.

FIG. 2 illustrates an example network architecture 200 in which aspects of various embodiments can be implemented. It should be understood that this is merely an example networking environment, and there can be various other configurations, components, and arrangements used for other networks in accordance with the various embodiments. This example shows a design that can be used for an environment such as a data center, wherein a source, such as any of a number of client devices 202, remote servers, or applications, is able to send requests across at least one network 204, such as the Internet or a cellular network, to be received by one or more components of the network 200. Such a configuration can be used in some embodiments to provide resource capacity for one or more users or customers as part of a shared-resource environment, where a user is able to utilize a client device 202 to submit requests across at least one network 204 to a multi-tenant resource provider environment. The client device can include any appropriate electronic device operable to send and receive requests, messages, or other such information over an appropriate network and convey information back to a user of the device. Examples of such client devices include personal computers, tablet computers, smart phones, notebook computers, and the like. The network(s) 204 can include any appropriate network, including an intranet, the Internet, a cellular network, a local area network (LAN), or any other such network or combination, and communication over the network can be enabled via wired and/or wireless connections. The resource provider environment can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In this example, a detection service 206 may operate as a standalone service or part of a resource provider environment. The detection service 206 may be incorporated into one or more products or services being offered by a provider, such as distributed machine learning systems where a user can bring their own models or utilize models trained and maintained by a provider. It should be appreciated that the detection service 206 may access or otherwise communicate with different services within a distributed environment and, moreover, that various features of the detection service 206 may also be or alternatively be associated with other systems.

In various embodiments, the detection service 206 or associated resource provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation.

As an example, the provider environment may include a plurality of resources, where the detection service 206 may be one of those resources. Additionally, the resources may include, for example, application servers operable to process instructions provided by a user or database servers operable to process data stored in one or more data stores in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize at least a portion of one or more resources (where that portion may be unknown or undeterminable to the user) or where the user has access to and wants to interact with the detection service 206, can submit a request that is received to an interface layer 208 of the detection service 206. The interface layer can include application programming interfaces (APIs) or other exposed interfaces enabling a user to submit requests to the detection service 206, such as through a provider environment. The interface layer 208 in this example can also include other components as well, such as at least one Web server, routing components, load balancers, and the like.

A request may include providing one or more inputs, such as images, videos, live streams, or the like, to the detection service 206 for evaluation. The inputs may be directed uploaded or links or manifests to provide access to the inputs may be provided, for example by accessing the input from third party storage locations 210. Inputs may be provided to one or more processing or pre-processing units 212 that prepare the inputs for evaluation by one or more machine learning systems, such as one or more classifiers 214. By way of example, preprocessing for a video file or a live stream may include extracting one or more frames for evaluation. In other embodiments, various other preprocessing steps may also be performed, including by way of example, resizing, noise removal, segmentation, smoothing, and the like. Different classifiers 214 may be trained or otherwise utilized for different types of input files. In various embodiments, classifiers 214 may be provided as a part of a service, with one or more models be updated and managed by the provider. However, it should be appreciated that a user may provide a specialized model or may provide training data in order to enable particularized training and specialization for one or more models. Moreover, in various embodiments, the classifier 214 may be utilized prior to providing the inputs to the detection service 206. By way of example, the client 202 may have their own models that evaluate various inputs and then label an image as either including a defect or not. The client 202 may then only provide the images that have been labeled as including a defect, which may reduce their use of resources with the provider. As a result, classifiers 214 are shown as an example and may not be utilized if pre-classified or pre-labeled inputs are provided to the detection service 206.

The classifier 214 may be trained and updated using training data 216, which may include information that functions as ground truth data. The information associated with the training data 216 may, in certain embodiments, be associated with one or more particular functions or intended outcomes for classifier 214, such as particular industrial or medical applications, among other options. In various embodiments, human reviewers annotate or otherwise label images to serve as training data. It should be appreciated that a user may provide their own training data to specialize or otherwise particularly train one or more models. In at least one embodiment, training data may be utilized to enable the classifier 214 to develop one or more feature vectors associated with defects and/or anomalies within image data. By way of example, defects may corresponds to manufacturing errors within a product, such as damaged threads on a screw. Once trained, the classifier 214 may analyze one or more images, identify one or more regions that include threads, and then identify whether or not at least a portion of a thread is deemed as having a defect based, at least in part, on a threshold or range.

In this example, an output from the classifier 214 may be directed toward one or more machine learning (ML) systems 218, which may include one or more explainers 220 to facilitate local defect detection. The output from the classifier 214 may be directed toward the ML system 218 only when a defect is detected, thereby conserving processing resources by not evaluating images for local defects when no defect is detected. Moreover, in embodiments where the classifier 214 is not utilized, such as embodiments where the pre-labeled are pre-identified defects are provide, the processing module 212 may direct the input toward the ML systems 218. As noted above, the various explainers 220 may include one or more machine learning techniques or models that provide information related to a particularized area or region of an image that lead to a determination that image includes a defect. The information obtained from the explainers 220 may be analyzed 222 to generate one or more heat maps, where a "hotter" area may correspond to a region with a higher confidence with respect to a defect and a "colder" area may correspond to a region with a lower confidence with respect to a defect. In at least one embodiment, results from each of, or a portion of, the explainers 220 may be aggregated to generate a common or combined heat map, where respective confidence values are normalized in order to identify overlapping regions, which are more likely to provide the cause or driver behind the original defect detection. An output 224 may include a heat map that visualizes the detected defects such that a human reviewer may analyze one or more images. It should be appreciated that the output 224 may not be provided to a human reviewer in other embodiments and may be utilized to process one or more downstream steps, such as directing components with identified defects to certain areas of a production facility for further analysis, rework, or the like.

Figure 3:
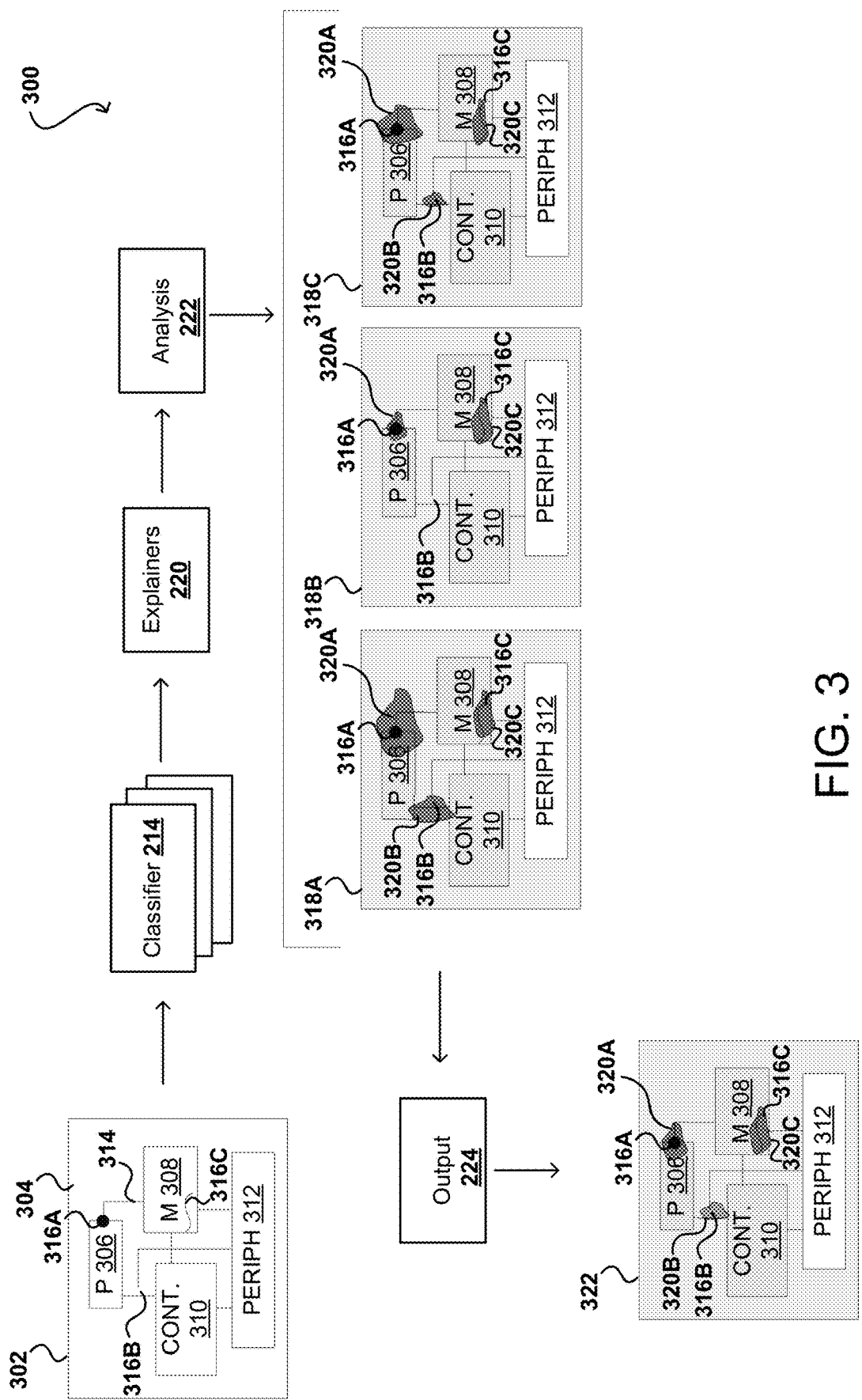
FIG. 3 illustrates an example workflow for local defect detection that can be utilized in accordance with various embodiments.

FIG. 3 illustrates an example workflow 300 that may be utilized to detect one or more defects, in accordance with embodiments of the present disclosure. In this example, an input image 302 corresponds to a computer chip 304 that includes a variety of components and connections. For example, the chip 304 includes a processor 306, a memory device 308, a controller 310, and peripheral devices 312. Furthermore, the illustrated chip 304 also includes various connections 314 between the components. In this example, several defects 316 are present on the chip 304. A first defect 316A corresponds to too much solder material along the connection 314 between the processor 306 and the memory device 308. A second defect 316B corresponds to a short along a connection 314. A third defect 316C corresponds to damage along the memory device 308.

The image 302 is provided to the classifier 214, where the image 302 is evaluated and is determined to include one or more defects based, at least in part, on training data associated with the classifier 214. As a result, the image 302 continues along the pipeline, but it should be appreciated that if no defect were detected further evaluation would not occur. Moreover, in various embodiments, the classifier 214 may be omitted if the image 302 were already labeled as having a defect and was being provided for additional processing using the explainers. While identification of one or more defects may be helpful, merely providing a binary classification does not provide information associated with why the image 302 was determined to include a defect, which may be useful in diagnosing errors in the production line of the chip 304, in this example. Furthermore, it should be appreciated that understanding why an image is classified may also be important for other industries, such as medical industries, and embodiments are not limited to only manufacturing operations. The image 302 is directed toward the explainers 220 for further evaluation to provide local defect detection. For example, the explainers 220 may identify one or more regions or portions of image 302 that may have led to a determination, by the classifier 214 or another classifier associated with an image provider, that the image 304 includes a defect. In at least one embodiment, the analysis 222 may be utilized to generate one or more outputs 318, such as heat maps, from the explainers 220 to visualize one or more regions associated with potential defects. It should be appreciated that the analysis 222 may be performed by one or more functions of the explainers 220 in various embodiments.

In this example, the outputs 318 are produced from multiple explainers 220. There may be any number of explainers 220, where each explainer may utilize one or more different models. In this example, a first explainer output 318A includes a heat map represented by differently shaded regions of output 318A. As shown, different regions 320 are highlighted with darker shading than other regions, thereby being indicative of an area that contributed a determination from the classifier 214 that a defect was present. In this example, the explainer 220A associated with the first explainer output 318A illustrates regions 320A-320C corresponding to the defects 316A-316C, respectively. In the example, the heat map shows darker shading at the regions 320A-320C, which generally cover each of the defects 316A-316C.

Further illustrated is an example of a second explainer output 318B, which includes a heat map showing regions 320A, 320C, but not 320B, as shown in first explainer output 318A. Additionally, as previously indicated, different regions include different shading, with lighter regions less indicative of defects and darker regions more indicative of defects. A third explainer output 318C further includes regions 320A-320C corresponding to locations of defects 316A-316C. As shown, different regions 320 have different sizes in each of the outputs 318A-318C, illustrating that different explainers 220 may use different criteria or information when detecting defects.

In at least one embodiment, an output 224 may aggregate or otherwise collect information from the explainer outputs 318A-318C to generate a combined output 322. As shown in the combined output 322, the regions 320A, 320C are darker than the region 320B, which may be due to a higher confidence score because regions 320A, 320C were identified by each explainer 220, while region 320B was only identified by two of the explainers. In various embodiments, the combined output 322 may be provided for visual inspection to a human reviewer or may be used to trigger one or more downstream actions, such as marking the chip 302 for review prior to shipment.

Figure 4:
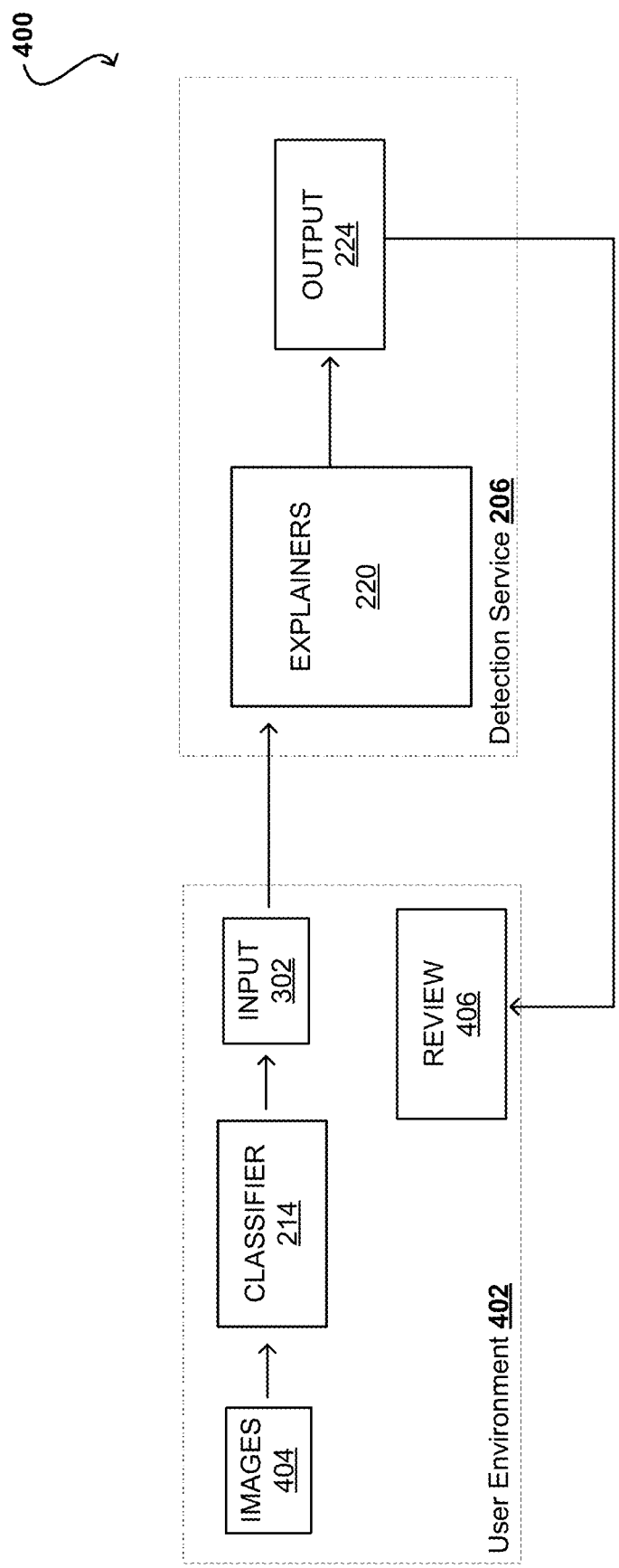
FIG. 4 illustrates an example environment for local defect detection that can be utilized in accordance with various embodiments.

FIG. 4 illustrates an environment 400 illustrating a pre-classification step prior to providing an input 302 to the detection service 206. In this example, a user environment 402 may take images 404 for pre-classification, such as by using one or more classifiers 214, to generate the input 302 for the detection service 206. In this manner, the input 302 may be limited to only images that were labeled as having some type of defect. In at least one embodiment, pre-classification may reduce provider resources usage, which may also reduce costs for the user.

The input 302 may be provided to the explainers 220 for localized defect detection to provide additional information to the user as to why the input 302 was labeled as including some defect. Information from the explainers 220, such as confidence values or heat maps, may be utilized by to the output module 224 to provide a reviewer 406 with some information. In at least one embodiment, the reviewer 406 may be a human reviewer that may utilize the information to glean additional insights into the classifier determination. In various embodiments, the reviewer 406 may further determine additional steps upon review of the output.

Figure 5:
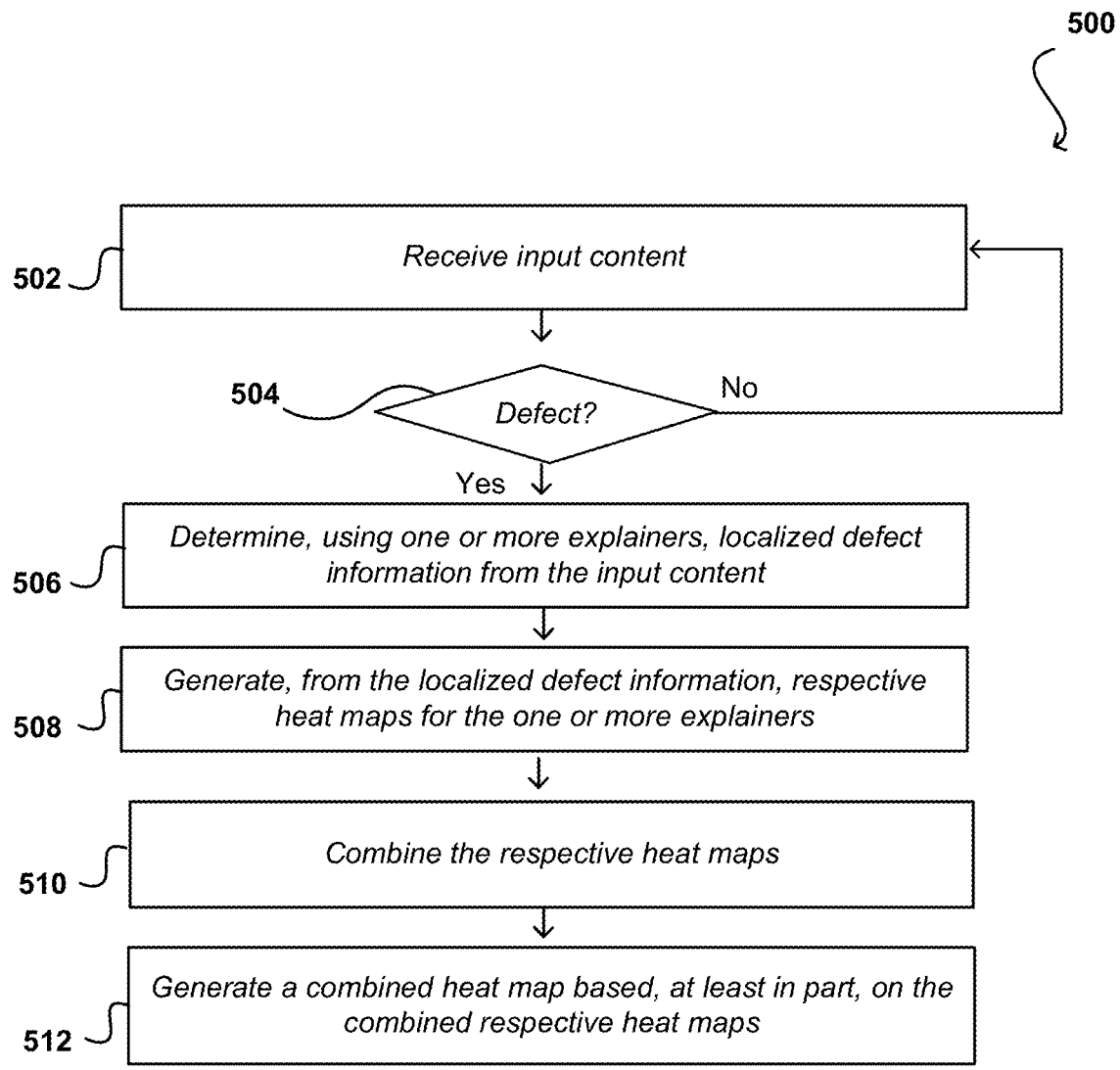
FIG. 5 illustrates an example process for performing local defect detection that can be utilized in accordance with various embodiments.

FIG. 5 illustrates an example process 500 for detecting the occurrence of defects or anomalies that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, input content is received at a detection system 502. For example, the input content may include one or more still images, a video feed, a video segment, or the like. In at least one embodiment, one or more pre-processing steps may be utilized to prepare the input content for evaluation, such as selecting one or more frames from a video, among other options. The input content is evaluated to determine whether a defect is present 504. For example, one or more trained machine learning systems, such as a classifier, may evaluate regions of the input content to determine whether one or more regions includes one or more defects. If no defect is present, additional content may be received for evaluation.

If a defect is present, one or more explainers may determine localized defect information 506. By way of example, the one or more explainers may include one or more trained models that utilize localized anomaly detection techniques in order to provide context as to why an image was marked as including a defect. The context may include providing information as to why one or more specific regions were selected. This localized information provides more data than a binary defect/no defect classification, which may be useful in embodiments where images contain multiple defects, defects of differing intensity, or different types of defects, among other scenarios.

In at least one embodiment, localized defect information may be used to generate one or more respective heat maps 508, where each explainer may have a separate heat map. The heat maps may be used to visually identify regions or areas most likely to have driven the classification result. For example, the heat maps may have regions with different intensities, where a larger intensity is indicative of a higher confidence score for a defect. The respective heat maps may then be combined 510 in order to generate an combined heat map output 512. Combining the heat maps may provide additional context regarding the confidence that a particular region drove the classification result by aggregating or otherwise compounding the values from different heat maps. For example, if three different heat maps were used in the combination, and all three included overlapping regions, there would be a high confidence that such a region contributed to the classification result. In various embodiments, the output may be provided visually to a human reviewer that could evaluate identified regions to determine or evaluate potential mitigating steps.

Figure 6:
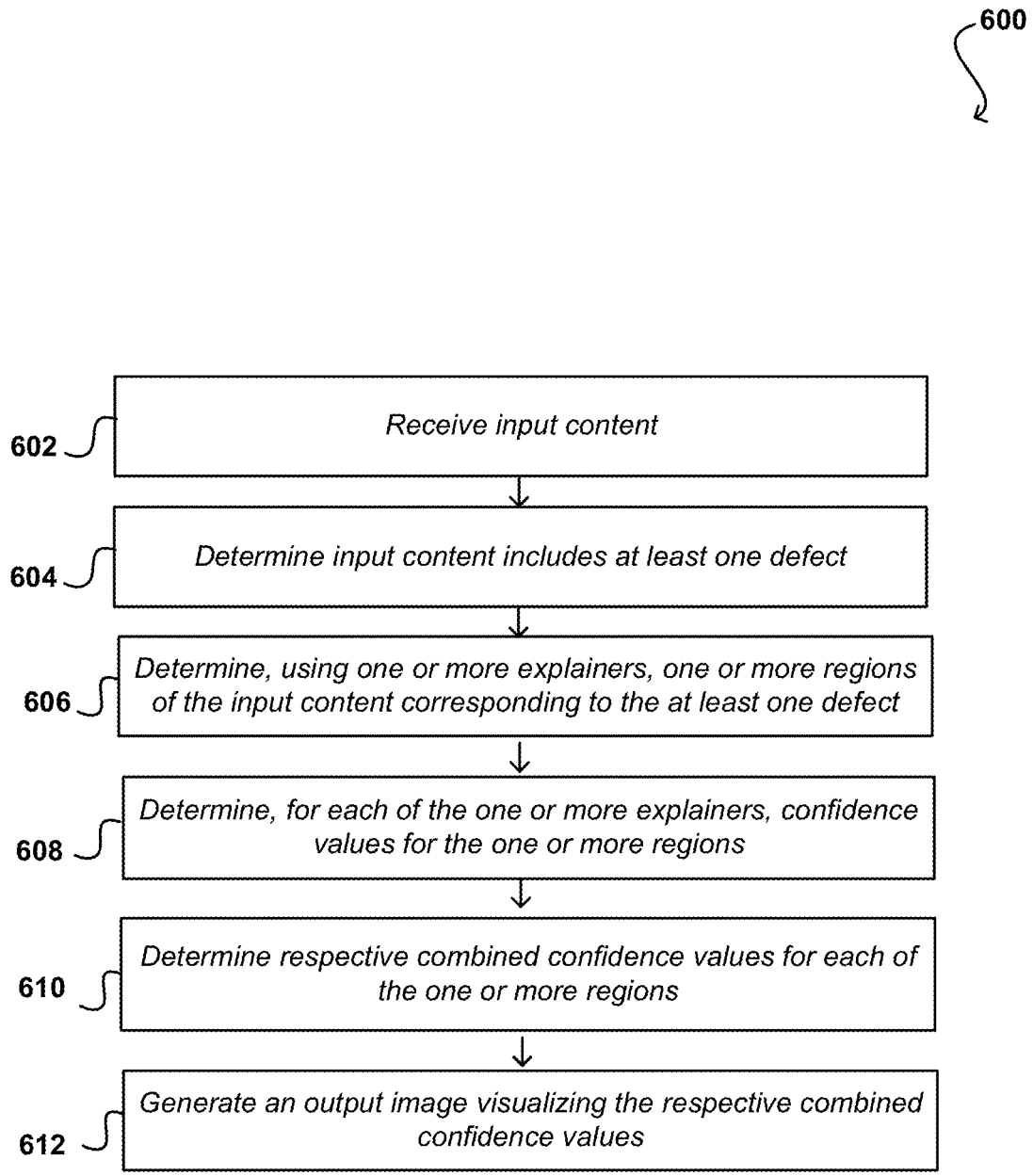
FIG. 6 illustrates an example process for performing local defect detection that can be utilized in accordance with various embodiments.

FIG. 6 illustrates an example process 600 for detecting the occurrence of defects or anomalies that can be utilized in accordance with various embodiments. In at least one embodiment, input content, such as still images or video, is received 602. The input content may be evaluated, such as by one or more trained classifiers, to determine the input content includes at least one defect 604. The input content may be further processed, such as by using one or more explainers trained for local anomaly detection, to determine one or more regions of the input content corresponding to the at least one defect 606. For example, the one or more explainers may be used to determine why the input content was classified as having a defect, rather than just providing classification information at a high level.

In at least one embodiment, confidence values for each of the one or more regions identified by the one or more explainers may be determined 608. The confidence values may correspond to a likelihood that one or more regions, or certain pixels forming the one or more regions, corresponds to a defect. It should be appreciated that various explainers may have different confidence thresholds, and as a result, confidence values may be normalized, such as on a scale of 0-1. Respective confidence values may then be combined for each of the one or more regions 610. For example, if a first explainer has a confidence value of 1 for a first region, a second explainer has a confidence value of 0.85 for a first region, and a third explainer has a confidence value of 0.9 for a first region, the aggregate may be approximately 0.88. Such a region would have a higher confidence value than a first explainer with a confidence value of 1 for a first region, a second explainer with a confidence value of 0 for a first region, and a third explainer with a confidence value of 1 for a first region, where the aggregate is approximately 0.66. Accordingly, overlapping regions between explainers may drive a higher confidence value that particular regions contributed to the classification of the input content having a defect. An output may be generated 612, such as a visualized output that may then be further evaluated to determine which regions include defects or used as additional training data, among other options.

When creating and training a machine learning model, it can be desirable in at least some embodiments to specify model settings or training parameters that will result in a model capable of making the most accurate predictions. Example parameters include the number of passes to be performed (forward and/or backward), regularization, model size, and shuffle type. As mentioned, however, selecting model parameter settings that produce the best predictive performance on the evaluation data might result in an overfitting of the model. Overfitting occurs when a model has memorized patterns that occur in the training and evaluation data sources, but has failed to generalize the patterns in the data. Overfitting often occurs when the training data includes all of the data used in the evaluation. A model that has been over fit may perform well during evaluation, but may fail to make accurate predictions on new or otherwise unlabeled data. To avoid selecting an over fitted model as the best model, a training manager can reserve additional data to validate the performance of the model. For example, as illustrated in the training pipeline of FIG. 7, a training data set, such as may include labeled or classified data 702, might be divided into 60 percent for training, and 40 percent for evaluation or validation, which may be divided into two or more stages. A base neural network 706 or machine learning model can be selected for training by a training manager, which cause inferences to be performed on the training data using the model, can compare these inferences against the ground truth training data, can determine an appropriate loss value, and then can perform backpropagation for this loss in order to adjust one or more of the network or model parameters until an end criterion is satisfied and a trained model 708 is obtained.

After selecting the model parameters that work well for the evaluation data, leading to convergence on a subset of the validation data, such as half the validation data, a second validation may be executed with a remainder of the validation data to ensure the performance of the model. If the model meets expectations on the validation data, then the model is not overfitting the data. Alternatively, a test set or held-out set may be used for testing the parameters. Using a second validation or testing step helps to select appropriate model parameters to prevent overfitting. However, holding out more data from the training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate the predictive accuracy of a given model. One example evaluation outcome contains a prediction accuracy metric to report on the overall success of the model, as well as visualizations to help explore the accuracy of the model beyond the prediction accuracy metric. The outcome can also provide an ability to review the impact of setting a score threshold, such as for binary prediction or labeling, and can generate alerts on criteria to check the validity of the evaluation. The choice of the metric and visualization can depend at least in part upon the type of model being evaluated.

Once trained and evaluated satisfactorily, the trained machine learning model can be used to build or support a machine learning application. In one embodiment building a machine learning application is an iterative process that involves a sequence of steps. The core machine learning problem(s) can be framed in terms of what is observed and what answer the model is to predict. Data can then be collected, cleaned, and prepared to make the data suitable for consumption by machine learning model training algorithms. The data can be visualized and analyzed to run sanity checks to validate the quality of the data and to understand the data. It might be the case that the raw data (e.g., input variables) and answer (e.g., the target) are not represented in a way that can be used to train a highly predictive model. Therefore, it may be desirable to construct more predictive input representations or features from the raw variables. The resulting features can be fed to the learning algorithm to build models and evaluate the quality of the models on data that was held out from model building. The model can then be used to generate predictions of the target answer for new data instances.

Figure 7:
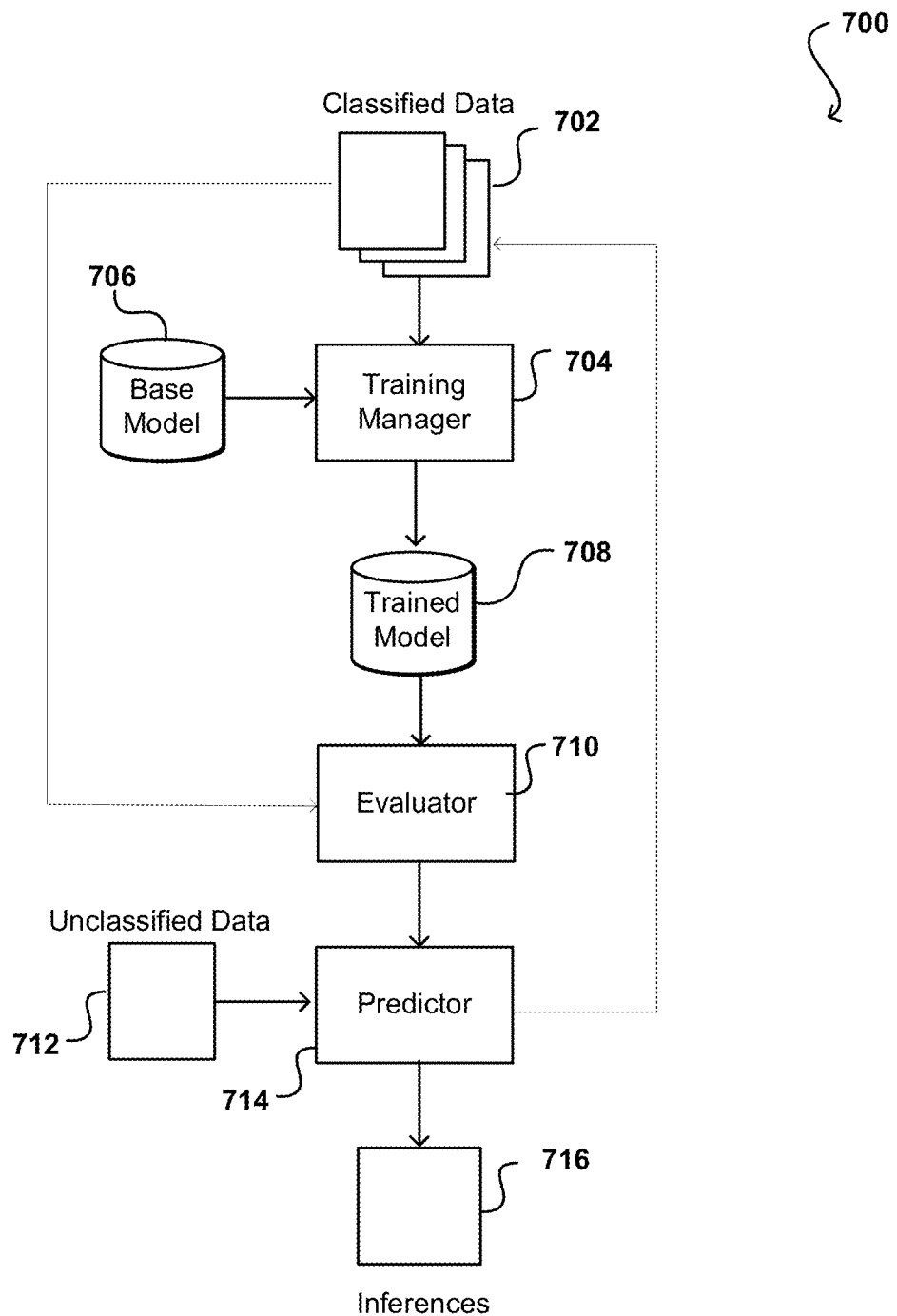
FIG. 7 illustrates an example training pipeline that can be utilized in accordance with various embodiments.

In the example system 700 of FIG. 7, the trained model 708 after evaluation by an evaluator 710 is provided, or made available, to a predictor 714 that is able to use the trained model to process unclassified data, or data that was not utilized as part of the training process or labeled for use in such training. This may include, for example, data received from users or third parties, such as query images that are looking for information about what is represented in those images. The received data can be processed by the predictor using the trained model, and the results 716 (i.e., classifications or predictions) that are produced can be sent back to the respective sources or otherwise processed or stored. In some embodiments, and where such usage is permitted, the predicted data instances can be stored to the classified data repository, or repository for data in which inferences or predictions have been made, which can be used for further training of the trained model 708 by the training manager. In some embodiments the model will be retrained at various times, depending upon factors such as the size of the data set or complexity of the model.

The predictor can include appropriate hardware and software for processing data using the trained model. In some instances, the predictor will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

Figure 8:
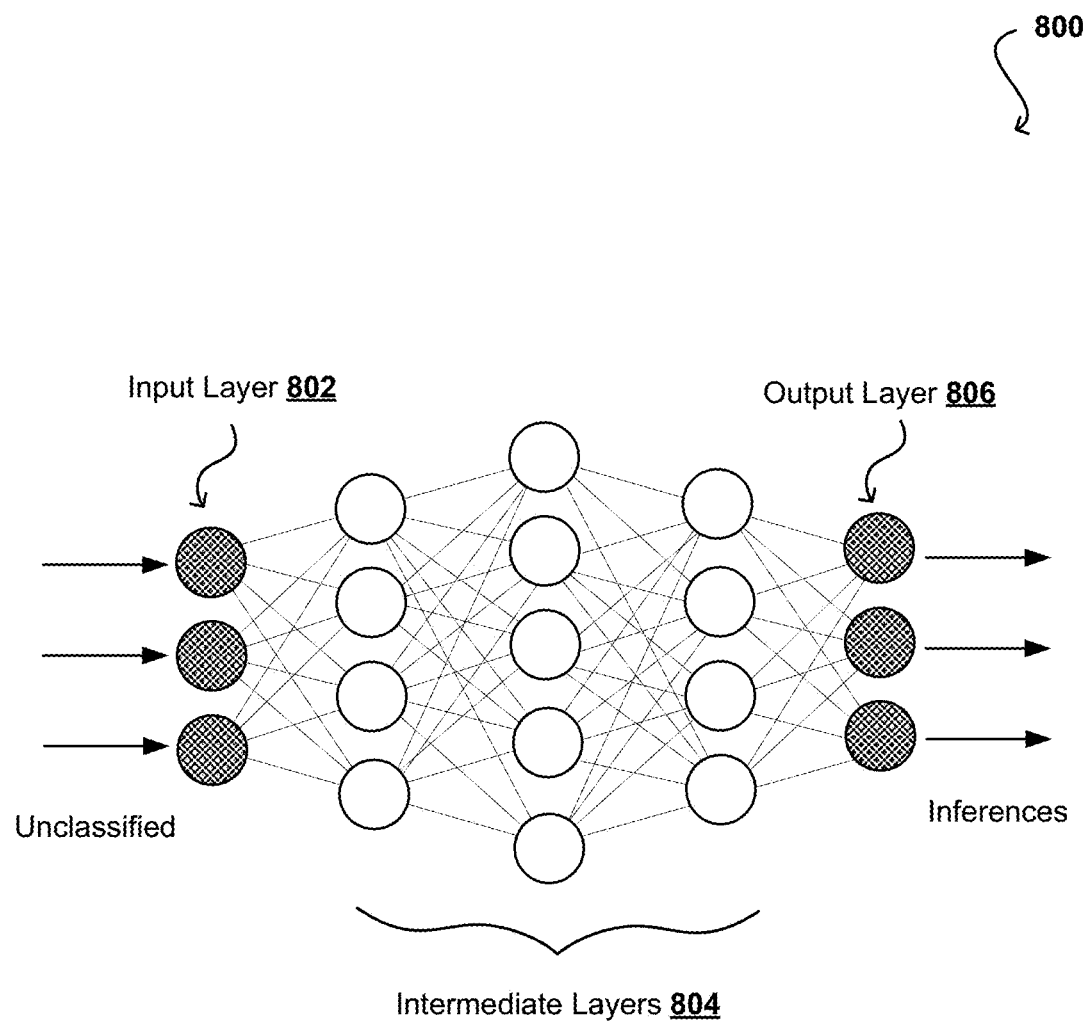
FIG. 8 illustrates an example neural network that can be utilized in accordance with various embodiments.

FIG. 8 illustrates an example neural network 800, or other statistical model, that can be utilized in accordance with various embodiments. In this example the statistical model is an artificial neural network (ANN) that includes a multiple layers of nodes, including an input layer 802, an output layer 806, and multiple intermediate layers 804 of nodes, often referred to as "hidden" layers, as the internal layers and nodes are typically not visible or accessible in conventional neural networks. As discussed elsewhere herein, there can be additional types of statistical models used as well, as well as other types of neural networks including other numbers of selections of nodes and layers, among other such options. In this network, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

As mentioned, some embodiments can utilize backpropagation to calculate a gradient used for determining the weights for the neural network. Backpropagation is a form of differentiation, and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

Figure 9:
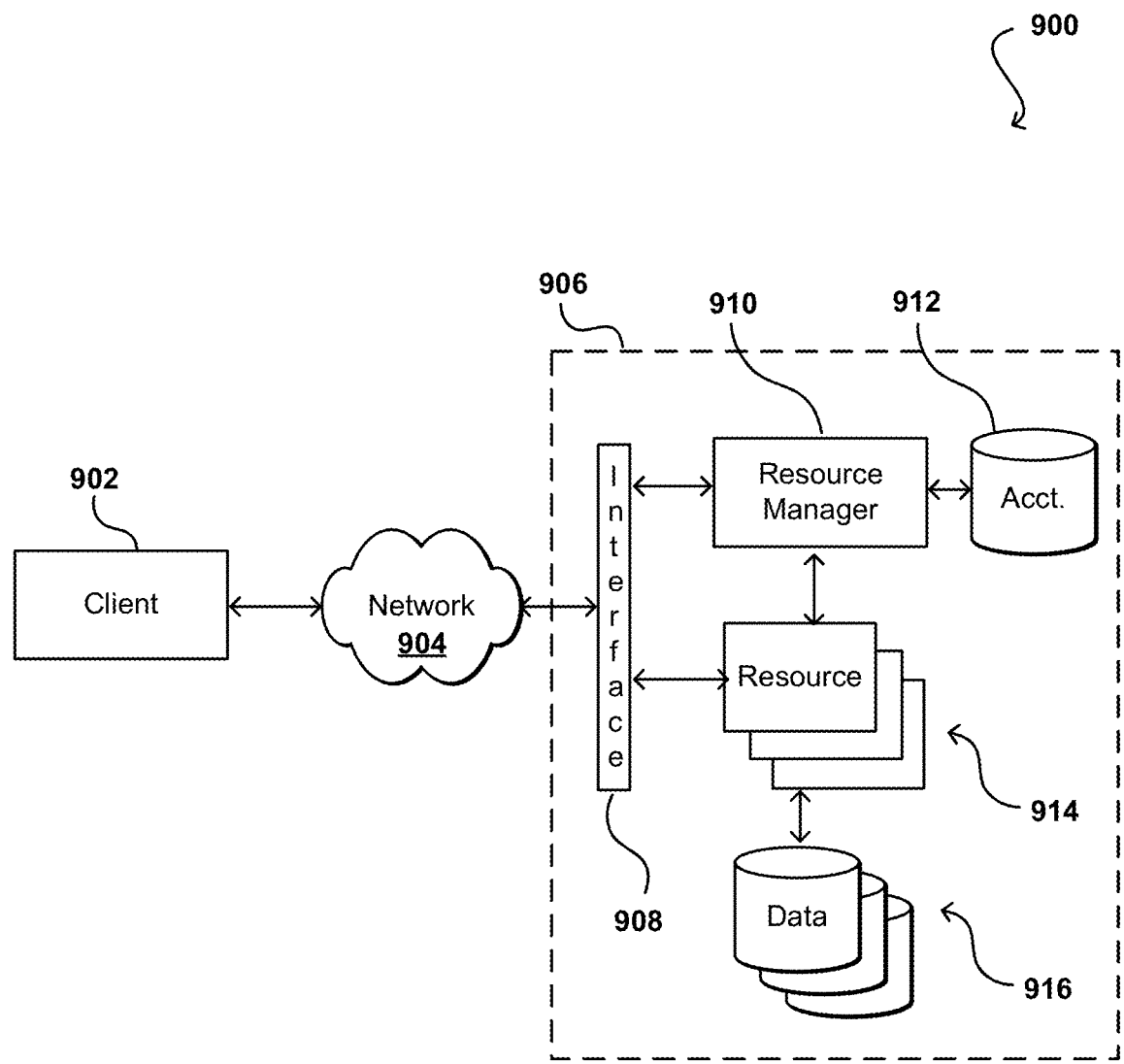
FIG. 9 illustrates components of an example resource environment in which aspects of various embodiments can be implemented.

FIG. 9 illustrates an example environment 900 in which aspect of various embodiments can be implemented. Such an environment can be used in various embodiments to provide resource capacity for one or more users, or customers of a resource provider, as part of a shared or multi-tenant resource environment. In this example a user is able to utilize a client device 902 to submit requests across at least one network 904 to a multi-tenant resource provider environment 906. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 904 can include any appropriate network, including an intranet, the Internet, a cellular network, a local area network (LAN), or any other such network or combination, and communication over the network can be enabled via one or more wired and/or wireless connections. The resource provider environment 906 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 906 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 914 of one or more types. These types can include, for example, application servers operable to process instructions provided by a user or database servers operable to process data stored in one or more data stores 916 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 914 can submit a request that is received to an interface layer 908 of the provider environment 906. The interface layer can include application programming interfaces (APIs) or other exposed interfaces enabling a user to submit requests to the provider environment. The interface layer 908 in this example can also include other components as well, such as at least one Web server, routing components, load balancers, and the like. When a request to provision a resource is received to the interface layer 908, information for the request can be directed to a resource manager 910 or other such system, service, or component configured to manage user accounts and information, resource provisioning and usage, and other such aspects. A resource manager 910 receiving the request can perform tasks such as to authenticate an identity of the user submitting the request, as well as to determine whether that user has an existing account with the resource provider, where the account data may be stored in at least one data store 912 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 902 to communicate with an allocated resource without having to communicate with the resource manager 910, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 910 (or another such system or service) in this example can also function as a virtual layer of hardware and software components that handles control functions in addition to management actions, as may include provisioning, scaling, replication, etc. The resource manager can utilize dedicated APIs in the interface layer 908, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 908 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 10:
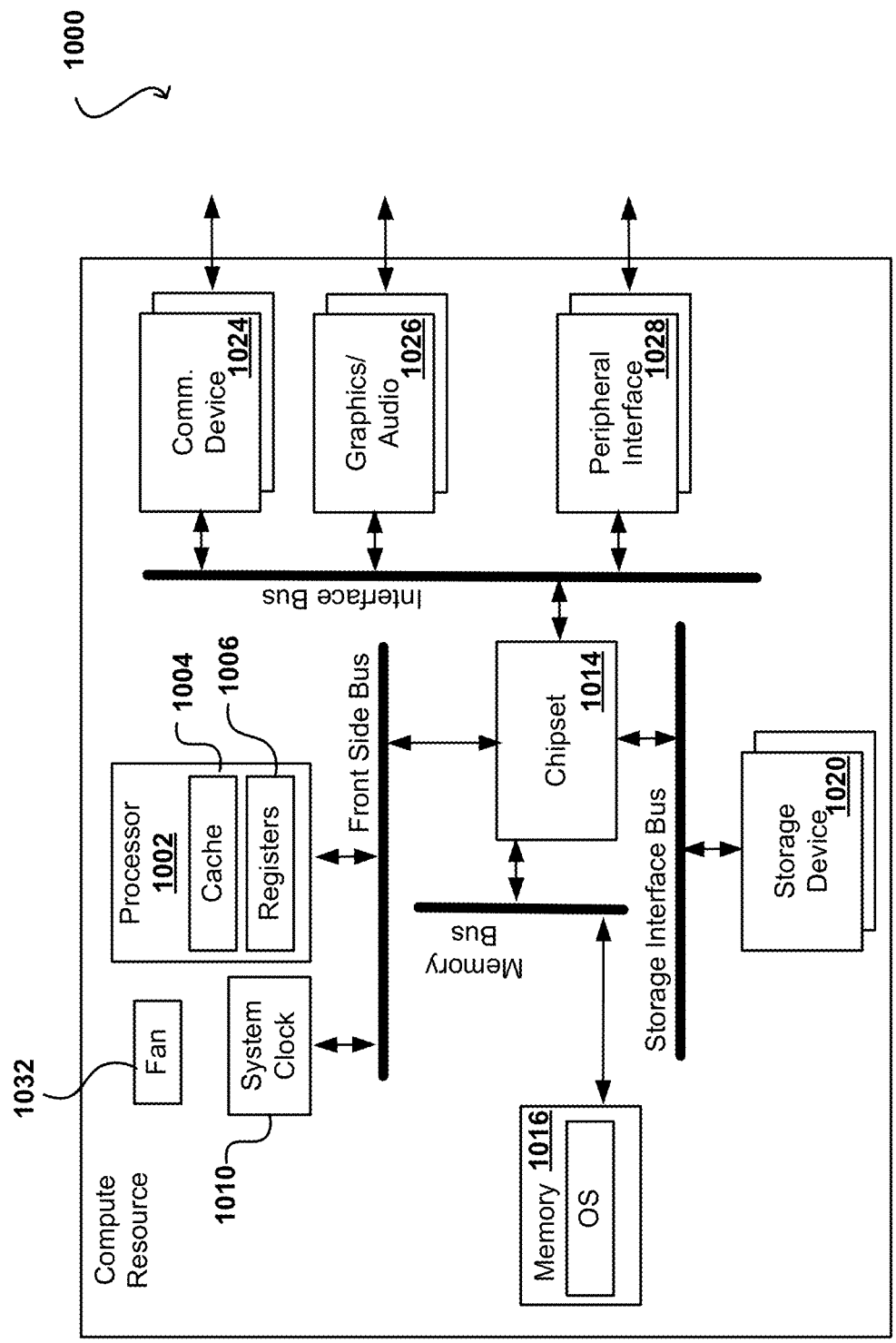
FIG. 10 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 10 illustrates components of an example computing resource 1000 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 1000 (e.g., a desktop or network server) will have one or more processors 1002, such as central processing units (CPUs), graphics processing units (GPUs), and the like, that are electronically and/or communicatively coupled with various components using various buses, traces, and other such mechanisms. A processor 1002 can include memory registers 1006 and cache memory 1004 for holding instructions, data, and the like. In this example, a chipset 1014, which can include a northbridge and southbridge in some embodiments, can work with the various system buses to connect the processor 1002 to components such as system memory 1016, in the form or physical RAM or ROM, which can include the code for the operating system as well as various other instructions and data utilized for operation of the computing device. The computing device can also contain, or communicate with, one or more storage devices 1020, such as hard drives, flash drives, optical storage, and the like, for persisting data and instructions similar, or in addition to, those stored in the processor and memory. The processor 1002 can also communicate with various other components via the chipset 1014 and an interface bus (or graphics bus, etc.), where those components can include communications devices 1024 such as cellular modems or network cards, media components 1026, such as graphics cards and audio components, and peripheral interfaces 1028 for connecting peripheral devices, such as printers, keyboards, and the like. At least one cooling fan 1032 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 1002 can obtain data from physical memory 1016, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 1004 in at least some embodiments. The computing device 1000 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 1028, a communication device 1024, a graphics or audio card 1026, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 1002 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive messages, such as datagrams.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C#or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining an instance of content includes at least one defect;
   analyzing the instance of content, using a set of explainers, to generate a set of potential defect locations;
   determining respective confidence values for the potential defect locations of the set of potential defect locations for each of the explainers of the set of explainers, the respective confidence values indicating a likelihood that the potential defect locations contain the at least one defect;
   generating respective combined confidence values for each potential defect location of the set of potential defect locations based, at least in part, on a combination of the respective confidence values for each of the explainers of the set of explainers at each potential defect location;
   generating, based at least in part on the respective combined confidence values, a visual output of the instance of content, wherein one or more indicators, corresponding to individual combined confidence values, are overlayed over the instance of content at the corresponding potential defect locations to visually represent aggregate results of the respective combined confidence values associated with the one or more indicators; and providing the visual output to one or more reviewers.

2. The computer-implemented method of claim 1, wherein the instance of content includes an image.

3. The computer-implemented method of claim 1, wherein the set of explainers include localized anomaly detection techniques including at least one of a SHAP gradient explainer, activation layer visualizations, Grad-CAM, or occlusion sensitivity.

4. The computer-implemented method of claim 1, further comprising:
   receiving a second instance of content;
   determining the second instance of content does not include at least one defect; and
   stopping further evaluation of the second instance of content.

5. The computer-implemented method of claim 1, further comprising:
   generating, for each explainer of the set of explainers, a respective explainer heat map based, at least in part, on the respective confidence values for each potential defect location of the set of potential defect locations.

6. A computer-implemented method, comprising:
   determining, using a set of detection techniques, a region of content corresponding to at least one defect;
   determining, for each detection technique of the set of detection techniques, respective confidence values for the region of content;
   determining a combined confidence value for the region of content based, at least in part, on the respective confidence values; and
   generating a visualization of the region of content based, at least in part, on the combined confidence value for the region of content, the visualization including respective representations for the at least one defect for each detection technique overlaid over each other to visually represent an aggregate result of the combined confidence values associated with the respective representations.

7. The computer-implemented method of claim 6, wherein the region of content forms a portion of video content, further comprising:
   receiving the video content; and
   extracting one or more still image frames from the video content.

8. The computer-implemented method of claim 6, wherein the set of detection techniques include at least one of a SHAP gradient explainer, activation layer visualizations, Grad-CAM, or occlusion sensitivity.

9. The computer-implemented method of claim 6, wherein the visualization is a heat map.

10. The computer-implemented method of claim 6, further comprising:
    providing content to one or more classifiers; and
    determining, based at least in part on the one or more classifiers, that at least a portion of the content includes the at least one defect.

11. The computer-implemented method of claim 6, further comprising:
    generating, for each detection technique of the set of detection techniques, a respective heat map, the respective heat map having intensities indicative of the confidence values.

12. The computer-implemented method of claim 6, wherein the combined confidence values are averages of the respective confidence values for the region of content.

13. The computer-implemented method of claim 6, wherein the respective confidence values are normalized.

14. The computer-implemented method of claim 6, further comprising:
    providing the visualization to a human reviewer.

15. A system, comprising:
    at least one processor; and
    memory including instructions that, when executed by the at least one processor, cause the system to:
    determine, from a set of detection techniques, a region of content corresponding to at least one defect;
    determine, for each detection technique of the set of detection techniques, respective confidence values for the region of content;
    determine a combined confidence value for the region of content based, at least in part, on the respective confidence values; and
    generate a visualization of the content based, at least in part, on the combined confidence value for the region of content, the visualization including respective representations for the at least one defect for each detection technique overlaid overeach other to visually represent an aggregate result of the combined confidence values associated with the respective representations.

16. The system of claim 15, wherein the instructions when executed further cause the system to:
    provide content to one or more classifiers; and
    determine, based at least in part on the one or more classifiers, that at least a portion of the content includes the at least one defect.

17. The system of claim 15, wherein the set of detection techniques include at least one of a SHAP gradient explainer, activation layer visualizations, Grad-CAM, or occlusion sensitivity.

18. The system of claim 15, wherein the instructions when executed further cause the system to:
    generate, for each detection technique of the set of detection techniques, a respective heat map, the respective heat map having intensities indicative of the respective confidence values.

19. The system of claim 15, wherein the combined confidence values are averages of the respective confidence values for the region of content.

20. The system of claim 15, wherein the respective confidence values are normalized.

* * * * *